US010438609B2

(12) United States Patent
Foshee

(10) Patent No.: US 10,438,609 B2
(45) Date of Patent: Oct. 8, 2019

(54) SYSTEM AND DEVICE FOR AUDIO TRANSLATION TO TACTILE RESPONSE

(71) Applicant: George Brandon Foshee, Magnolia, AR (US)

(72) Inventor: George Brandon Foshee, Magnolia, AR (US)

( * ) Notice: Subject to any disclaimer, the term of this patent is extended or adjusted under 35 U.S.C. 154(b) by 20 days.

(21) Appl. No.: 15/406,473

(22) Filed: Jan. 13, 2017

(65) Prior Publication Data

US 2017/0213568 A1 Jul. 27, 2017

Related U.S. Application Data

(60) Provisional application No. 62/278,908, filed on Jan. 14, 2016.

(51) Int. Cl.
*G10L 21/16* (2013.01)
*G10L 21/06* (2013.01)
*G10L 15/02* (2006.01)

(52) U.S. Cl.
CPC ........ *G10L 21/16* (2013.01); *G10L 2015/025* (2013.01); *G10L 2021/065* (2013.01)

(58) Field of Classification Search
None
See application file for complete search history.

(56) References Cited

U.S. PATENT DOCUMENTS 7,251,605 B2 * 7/2007 Belenger ................. G10L 21/06 704/271
8,494,507 B1 * 7/2013 Tedesco .................... A61F 4/00 434/112
8,581,954 B2 * 11/2013 Lee .......................... G06F 3/016 348/14.01
8,754,757 B1 * 6/2014 Ullrich .................. G06F 16/683 340/407.1
9,201,143 B2 * 12/2015 Slamka ................... G01S 19/14
9,275,653 B2 * 3/2016 Heubel ................... G06F 3/011
9,612,661 B2 * 4/2017 Wagner ................... G06F 3/016
(Continued)

FOREIGN PATENT DOCUMENTS

KR 20000063489 A * 11/2000
KR 20000063489 A * 11/2000

OTHER PUBLICATIONS

Borg, Erik, et al. "Vibratory-coded directional analysis: Evaluation of a three-microphone/four-vibrator DSP system." Journal of rehabilitation research and development 38.2 (2001): 257-264. (Year: 2001).*

(Continued)

*Primary Examiner* — Jonathan C Kim
(74) *Attorney, Agent, or Firm* — Schrantz Law Firm, PLLC; Stephen D. Schrantz

(57) ABSTRACT

The translator detects audio with the use of at least one microphone. The system analyzes the audio input to determine the spoken words. The translator determines the phonemes of the spoken words and outputs each phoneme to the user. The translator maps each phoneme to a haptic code that represents the detected phoneme. After determining the phonemes to output to the user, the system actuates multiple actuators to communicate the code to the user. The actuators contact the user to communicate the code associated with each phoneme of the audio input.

20 Claims, 14 Drawing Sheets

(56) References Cited

U.S. PATENT DOCUMENTS

| | | | | |
|---|---|---|---|---|
| 9,773,391 | B1 * | 9/2017 | Foshee | G08B 21/02 |
| 9,905,090 | B2 * | 2/2018 | Ullrich | G06F 16/683 |
| 9,996,153 | B1 * | 6/2018 | Trotta | G06F 3/014 |
| 2004/0093214 | A1 * | 5/2004 | Belenger | G10L 21/06 704/269 |
| 2009/0023122 | A1 * | 1/2009 | Lieberman | G09B 19/003 434/258 |
| 2009/0207129 | A1 * | 8/2009 | Ullrich | H01H 13/70 345/156 |
| 2013/0044005 | A1 * | 2/2013 | Foshee | G09B 21/007 340/691.1 |
| 2014/0029762 | A1 * | 1/2014 | Xie | H04R 5/027 381/94.1 |
| 2014/0184496 | A1 * | 7/2014 | Gribetz | G02B 27/017 345/156 |
| 2015/0002808 | A1 * | 1/2015 | Rizzo, III | A61F 9/08 351/158 |
| 2015/0230033 | A1 * | 8/2015 | Sprague | H04R 25/407 381/313 |
| 2016/0195928 | A1 * | 7/2016 | Wagner | G06F 3/016 345/156 |
| 2016/0210834 | A1 * | 7/2016 | Dayal | G08B 21/02 |
| 2017/0011602 | A1 * | 1/2017 | Brav | G06F 1/163 |
| 2017/0116884 | A1 * | 4/2017 | Choi | G09B 21/004 |
| 2017/0180863 | A1 * | 6/2017 | Biggs | B06B 1/045 |
| 2017/0294086 | A1 * | 10/2017 | Kerdemelidis | G08B 6/00 |
| 2018/0067558 | A1 * | 3/2018 | Eagleman | G08B 1/08 |

OTHER PUBLICATIONS

Weisenberger, J., A. Heidbreder, and J. Miller. "Development and preliminary evaluation of an earmold sound-to-tactile aid for the hearing-impaired." J Rehabil Res Dev 24 (1987): 51-66. (Year: 1987).*

* cited by examiner

| Ref | Sound | Common | Usage |
|---|---|---|---|
| Consonants | | | |
| 1 | /b/ | b | ball |
| | /d/ | d | dog |
| | /f/ | f | fan |
| | /g/ | g | grape |
| | /h/ | h | hat |
| | /j/ | j | jellyfish |
| | /k/ | k | kite |
| | /l/ | l | leaf |
| | /m/ | m | monkey |
| | /n/ | n | nest |
| | /ng/ | ng | ring |
| | /p/ | p | pig |
| | /r/ | r | robot |
| | /s/ | s | sun |
| | /t/ | t | tap |
| | /v/ | v | van |
| | /w/ | w | web |
| | /y/ | y | yo-yo |
| | /z/ | z | zebra |
| | | | |
| Digraphs | | | |
| | /zh/ | s | treasure |
| | /ch/ | ch | cheese |
| | /sh/ | sh | shark |
| | /th/ | th | thongs (unvoiced) |
| | /th/ | th | feather (voiced) |
| | | | |
| Short Vowels | | | |
| | /a/ | a | cat |
| | /e/ | e | egg |
| | /i/ | i | igloo |
| | /o/ | o | orange |
| | /u/ | u | mug |
| | /oo/ | oo | book |
| | | | |
| Long Vowels | | | |
| | /ã/ | ai | snail |
| | /ẽ/ | ee | bee |
| | /ĩ/ | i | spider |

FIG. 6

| | | | |
|---|---|---|---|
| | /õ/ | oa | boat |
| | /ü/ | oo | moon |
| | /y//u/ | u | uniform |
| | /oi/ | oi | coin |
| | /ow/ | ow | cow |
| | /ə/ | er | ladder |
| | | | |
| R' Controlled Vowels | | | |
| | /ã/ | air | chair |
| | /ä/ | ar | car |
| | /ù/ | ir | bird |
| | /ô/ | aw | paw |
| | /ēə/ | ear | ear |
| | /üə/ | ure | cure |

FIG. 6A

| Effect ID | Haptic Effect |
|---|---|
| 1 | StrongClick_100, |
| 2 | StrongClick_60, |
| 3 | StrongClick_30, |
| 4 | SharpClick_100, |
| 5 | SharpClick_60, |
| 6 | SharpClick_30, |
| 7 | SoftBump_100, |
| 8 | SoftBump_60, |
| 9 | SoftBump_30, |
| 10 | DoubleClick_100, |
| 11 | DoubleClick_60, |
| 12 | TripleClick_100, |
| 13 | SoftFuzz_60, |
| 14 | StrongBuzz_100, |
| 15 | BuzzAlert750ms, |
| 16 | BuzzAlert1000ms, |
| 17 | StrongClick1_100, |
| 18 | StrongClick2_80, |
| 19 | StrongClick3_60, |
| 20 | StrongClick4_30, |
| 21 | MediumClick1_100, |
| 22 | MediumClick2_80, |
| 23 | MediumClick3_60, |
| 24 | SharpTick1_100, |
| 25 | SharpTick2_80, |
| 26 | SharpTick3_60, |
| 27 | ShortDoubleClickStrong1_100, |
| 28 | ShortDoubleClickStrong2_80, |
| 29 | ShortDoubleClickStrong3_60, |
| 30 | ShortDoubleClickStrong4_30, |
| 31 | ShortDoubleClickMedium1_100, |

FIG. 7

| | |
|---|---|
| 32 | ShortDoubleClickMedium2_80, |
| 33 | ShortDoubleClickMedium3_60, |
| 34 | ShortDoubleSharpTick1_100, |
| 35 | ShortDoubleSharpTick2_80, |
| 36 | ShortDoubleSharpTick3_60, |
| 37 | LongDoubleSharpClickStrong1_100, |
| 38 | LongDoubleSharpClickStrong2_80, |
| 39 | LongDoubleSharpClickStrong3_60, |
| 40 | LongDoubleSharpClickStrong4_30, |
| 41 | LongDoubleSharpClickMedium1_100, |
| 42 | LongDoubleSharpClickMedium2_80, |
| 43 | LongDoubleSharpClickMedium3_60, |
| 44 | LongDoubleSharpTick1_100, |
| 45 | LongDoubleSharpTick2_80, |
| 46 | LongDoubleSharpTick3_60, |
| 47 | Buzz1_100, |
| 48 | Buzz2_80, |
| 49 | Buzz3_60, |
| 50 | Buzz4_40, |
| 51 | Buzz5_20, |
| 52 | PulsingStrong1_100, |
| 53 | PulsingStrong2_60, |
| 54 | PulsingMedium1_100, |
| 55 | PulsingMedium2_60, |
| 56 | PulsingSharp1_100, |
| 57 | PulsingSharp2_60, |
| 58 | TransitionClick1_100, |
| 59 | TransitionClick2_80, |
| 60 | TransitionClick3_60, |
| 61 | TransitionClick4_40, |
| 62 | TransitionClick5_20, |
| 63 | TransitionClick6_10, |

FIG. 7A

| | |
|---|---|
| 64 | TransitionHum1_100, |
| 65 | TransitionHum2_80, |
| 66 | TransitionHum3_60, |
| 67 | TransitionHum4_40, |
| 68 | TransitionHum5_20, |
| 69 | TransitionHum6_10, |
| 70 | TransitionRampDownLongSmooth1_100to0, |
| 71 | TransitionRampDownLongSmooth2_100to0, |
| 72 | TransitionRampDownMediumSmooth1_100to0, |
| 73 | TransitionRampDownMediumSmooth2_100to0, |
| 74 | TransitionRampDownShortSmooth1_100to0, |
| 75 | TransitionRampDownShortSmooth2_100to0, |
| 76 | TransitionRampDownLongSharp1_100to0, |
| 77 | TransitionRampDownLongSharp2_100to0, |
| 78 | TransitionRampDownMediumSharp1_100to0, |
| 79 | TransitionRampDownMediumSharp2_100to0, |
| 80 | TransitionRampDownShortSharp1_100to0, |
| 81 | TransitionRampDownShortSharp2_100to0, |
| 82 | TransitionRampUpLongSmooth1_0to100, |
| 83 | TransitionRampUpLongSmooth2_0to100, |
| 84 | TransitionRampUpMediumSmooth1_0to100, |
| 85 | TransitionRampUpMediumSmooth2_0to100, |
| 86 | TransitionRampUpShortSmooth1_0to100, |
| 87 | TransitionRampUpShortSmooth2_0to100, |
| 88 | TransitionRampUpLongSharp1_0to100, |
| 89 | TransitionRampUpLongSharp2_0to100, |
| 90 | TransitionRampUpMediumSharp1_0to100, |
| 91 | TransitionRampUpMediumSharp2_0to100, |
| 92 | TransitionRampUpShortSharp1_0to100, |
| 93 | TransitionRampUpShortSharp2_0to100, |
| 94 | TransitionRampDownLongSmooth1_50to0, |
| 95 | TransitionRampDownLongSmooth2_50to0, |

FIG. 7B

| | |
|---|---|
| 96 | TransitionRampDownMediumSmooth1_50to0, |
| 97 | TransitionRampDownMediumSmooth2_50to0, |
| 98 | TransitionRampDownShortSmooth1_50to0, |
| 99 | TransitionRampDownShortSmooth2_50to0, |
| 100 | TransitionRampDownLongSharp1_50to0, |
| 101 | TransitionRampDownLongSharp2_50to0, |
| 102 | TransitionRampDownMediumSharp1_50to0, |
| 103 | TransitionRampDownMediumSharp2_50to0, |
| 104 | TransitionRampDownShortSharp1_50to0, |
| 105 | TransitionRampDownShortSharp2_50to0, |
| 106 | TransitionRampUpLongSmooth1_0to50, |
| 107 | TransitionRampUpLongSmooth2_0to50, |
| 108 | TransitionRampUpMediumSmooth1_0to50, |
| 109 | TransitionRampUpMediumSmooth2_0to50, |
| 110 | TransitionRampUpShortSmooth1_0to50, |
| 111 | TransitionRampUpShortSmooth2_0to50, |
| 112 | TransitionRampUpLongSharp1_0to50, |
| 113 | TransitionRampUpLongSharp2_0to50, |
| 114 | TransitionRampUpMediumSharp1_0to50, |
| 115 | TransitionRampUpMediumSharp2_0to50, |
| 116 | TransitionRampUpShortSharp1_0to50, |
| 117 | TransitionRampUpShortSharp2_0to50, |
| 118 | Longbuzzforprogrammaticstopping_100, |
| 119 | SmoothHum1Nokickorbrakepulse_50, |
| 120 | SmoothHum2Nokickorbrakepulse_40, |
| 121 | SmoothHum3Nokickorbrakepulse_30, |
| 122 | SmoothHum4Nokickorbrakepulse_20, |
| 123 | SmoothHum5Nokickorbrakepulse_10 |

FIG. 7C 170 160 162 164 166 168

| Ref | Sound | Common | Usage Example | Haptic Effect and Location | |
|---|---|---|---|---|---|
| Consonants | | | | Strong | Weak |
| | | | | | |
| | /b/ | b | ball | 10,0,0 | 11,0,0 |
| | /d/ | d | dog | 17,0,0 | 19,0,0 |
| | /f/ | f | fan | 27,0,0 | 29,0,0 |
| | /g/ | g | grape | 52,0,0 | 53,0,0 |
| | /h/ | h | hat | 44,0,0 | 46,0,0 |
| | /j/ | j | jellyfish | 64,0,0 | 68,0,0 |
| | /k/ | k | kite | 44,0,0 | 46,0,0 |
| | /l/ | l | leaf | 17,24,0 | 19, 26, 0 |
| | /m/ | m | monkey | 17,34, 0 | 19,36,0 |
| | /n/ | n | nest | 52,58,0 | 53,60,0 |
| | /ng/ | ng | ring | 0, 0, 10 | 0,0, 11 |
| | /p/ | p | pig | 0, 0,17 | 0,0, 19 |
| | /r/ | r | robot | 64, 0, 0 | 67, 0, 0 |
| | /s/ | s | sun | 0,0,27 | 0,0, 29 |
| | /t/ | t | tap | 0,0, 52 | 0,0, 53 |
| | /v/ | v | van | 0,0, 44 | 0,0, 46 |
| | /w/ | w | web | 0,0, 56 | 0,0, 57 |
| | /y/ | y | yo-yo | 0,0, 64 | 0,0, 68 |
| | /z/ | z | zebra | 0,0, 44 | 0,0, 46 |
| | | | | | |
| Digraphs | | | | | |
| | /zh/ | s | treasure | 70, 0, 0 | 71, 0, 0 |
| | /ch/ | ch | cheese | 74, 0, 0 | 75, 0, 0 |
| | /sh/ | sh | shark | 82, 0, 0 | 83, 0, 0 |
| | /th/ | th | thongs (unvoiced) | 94, 0,0 | 95, 0, 0 |
| | /th/ | th | feather (voiced) | 104, 0, 0 | 105, 0, 0 |
| | | | | | |
| Short Vowels | | | | | |
| | /a/ | a | cat | 1, 0, 0 | 3, 0, 0 |
| | /e/ | e | egg | 7, 0, 0 | 9, 0, 0 |
| | /i/ | i | igloo | 24, 0, 0 | 26, 0, 0 |
| | /o/ | o | orange | 47, 0, 0 | 40, 0, 0 |
| | /u/ | u | mug | 37, 0, 0 | 39, 0, 0 |
| | /oo/ | oo | book | 58, 0, 0 | 60, 0, 0 |
| | | | | | |
| Long Vowels | | | | | |
| | /ã/ | ai | snail | 1,1, 0 | 3,3, 0 |
| | /ẽ/ | ee | bee | 7,7, 0 | 9,9, 0 |

FIG. 8

| | | | | | |
|---|---|---|---|---|---|
| | /ī/ | i | spider | 24,24, 0 | 26,26, 0 |
| | /ō/ | oa | boat | 47,1, 0 | 40,3, 0 |
| | /ü/ | oo | moon | 58,58, 0 | 60,60, 0 |
| | /y//u/ | u | uniform | 37,37, 0 | 39,39, 0 |
| | /oi/ | oi | coin | 47,24, 0 | 40,26, 0 |
| | /ow/ | ow | cow | 47,56, 0 | 40,57, 0 |
| | /ə/ | er | ladder | 7,64, 0 | 9, 67, 0 |
| | | | | | |
| R' Controlled Vowels | | | | | |
| | /ã/ | air | chair | 1,1,64 | 3,3,67 |
| | /ä/ | ar | car | 1,64, 0 | 3,67, 0 |
| | /ù/ | ir | bird | 7,64, 0 | 7,67, 0 |
| | /ô/ | aw | paw | 1,64,64 | 3,67,67 |
| | /ēə/ | ear | ear | 7,64,64 | 7,67,67 |
| | /üə/ | ure | cure | 37,64,64 | 39,64,64 |

FIG. 8A

SYSTEM AND DEVICE FOR AUDIO TRANSLATION TO TACTILE RESPONSE

CROSS-REFERENCE TO RELATED APPLICATIONS

This application claims priority to and is a continuation-in-part of U.S. Patent Application No. 62/278,908 entitled SYSTEM AND DEVICE FOR AUDIO TRANSLATION TO TACTILE RESPONSE filed on Jan. 14, 2016.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

This invention relates generally to an audio translation device that alerts users to phonetic sounds in the vicinity of the user. More specifically, the audio translation device provides a frame placed on the user's head. Multiple actuators mounted on the frame activate according to detected audio. The actuators notify the user that audio has been detected. A microphone detects the audio.

Description of the Known Art

Patents and patent applications disclosing relevant information are disclosed below. These patents and patent applications are hereby expressly incorporated by reference in their entirety.

U.S. Pat. No. 7,251,605 issued to Belenger on Jul. 31, 2007 ("the '605 patent") teaches a speech to touch translator assembly and method for converting spoken words directed to an operator into tactile sensations caused by combinations of pressure point exertions on the body of the operator, each combination of pressure points exerted signifying a phoneme of one of the spoken words, permitting comprehension of spoken words by persons that are deaf and hearing impaired.

The known art provides a speech to touch translator assembly and method for converting a spoken message into tactile sensations upon the body of the receiving person, such that the receiving person can identify certain tactile sensations with corresponding words. The known art teaches assembling and arranging the phonemes from the library in their proper time sequence in digitized form coded in a suitable format to actuate the proper pressure finger combination for the user to interpret as a particular phoneme. The known art then teaches pressure fingers that are miniature electro-mechanical devices mounted in a hand grip (not shown) or arranged in some other suitable manner that permits the user to "read" and understand the code 20 (FIG. 2) transmitted by the pressure finger combinations actuated by the particular word sound.

The known art transmits a particular code to the user via actuated pressure finger combinations. The individual pressure fingers actuate to communicate the code. The user must then sense the actuation of each individual pressure finger. The user analyzes each sensed pressure finger to determine the code. Determining the code through the analysis of each pressure finger is tedious work and requires considerable concentration. The user must process these codes on the fly in real time to decode the detected audio.

The known art implements the code in binary that is difficult for the user to comprehend. The present invention simplifies the analysis of the codes by implementing actuators capable of more than one actuation. The user can more easily distinguish the actuators to determine the detected audio. Therefore, the present invention is needed to improve transmission of the information to the user. The present invention simplifies the transmission of the detected audio to the user thus allowing the user to analyze the codes in real time.

SUMMARY OF THE INVENTION

The present invention relates to haptic technology for assisting hearing-impaired individuals to understand speech directed at them in real time. Using two rows of four linear resonator actuators (LRAs), different vibration cues can be assigned to each of the 44 phonetic sounds (phonemes) of the English language—as well as other languages. These haptic symbols provide a translation of sound to physical contact. Software implemented in the system translates based on voice recognition.

One embodiment of the translation device informs the user of the phonemes detected in the vicinity of the user. The present invention provides the user with a safer experience and more protection by imparting a greater understanding of the surrounding environment to the user.

The translation system uses a high-performance microprocessor to process speech utterances (and other sounds). The processor converts these utterances into haptic effects. A haptic effect is an input that activates a deaf or hearing impaired person's touch sensors located in the skin. A haptic effect can take many forms from a simple tap to more complex sensory activations or combination of activations. While there have been many instances of using touch to communicate with the deaf, the translation system of the present invention converts speech into phonemes and then maps phonemes (and combinations of phonemes) into haptic effects communicated to the user.

A phoneme is the smallest unit of sound that distinguishes one word from another. A single phoneme or a combination of phonemes construct each word. Humans understand speech by recognizing phonemes and combinations of phonemes as words. Since relatively fewer phonemes are required to represent a word than the number of letters in a word, the phonemes provide an efficient mapping of speech to an understandable representation of a word that can be interpreted in real time.

The translator of the present invention alerts users to detected audio and translates the audio to a tactile output felt by the user. The translator assists the hearing impaired detect and understand the speech around the user. Stimulators of the present invention contact the user at different contact points to inform the user of the detected phonemes. The translator communicates the detected phonemes to the user to inform the user of the detected audio.

One embodiment of the translator is designed to be worn on a user. Different embodiments may be worn on a user's head, clothing, belt, arm bands, or otherwise attached to the user.

Such an embodiment provides a housing that may be worn by the user. The housing may be attached to the user's clothing, a hat, or may be installed on a pair of glasses to be placed on the user's head. Multiple actuators mounted on the frame actuate to provide information to the user. In one embodiment, LRAs serve as the actuators. The LRAs actuate with different effects. One embodiment of the LRA actuates with approximately 123 different effects. Each LRA provides more information than a simple on or off. The different feedbacks available through the LRA reduces the number of actuators needed to relay the information to the user. Instead, the user focuses on the detected feedback from the fewer number of actuators.

It is an object of the present invention to provide users with a tactile response to detected audio.

It is another object of the present invention to match detected audio with a phoneme.

It is another object of the present invention to communicate the detected phoneme to the user via a code delivered through actuators It is another object of the present invention to reduce the number of actuators required to communicate the code to the user.

It is another object of the present invention to transmit the code to the user via LRAs capable of more than on/off feedback.

It is another object of the present invention to transmit the code via an actuator that provides more than on/off feedback.

It is another object of the present invention to inform the user of the direction from which the audio is detected.

It is another object of present invention to notify the user whether the detected audio favors the user's left, right, or both.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIGS. 6 and 6A are a chart of phonemes of one embodiment of the present invention;

FIGS. 7, 7A, 7B, and 7C are a chart of haptic effects of one embodiment of the present invention;

FIGS. 8 and 8A are a chart of phonemes assigned to coded effect; and

DETAILED DESCRIPTION

The translator of the present invention may be used by the hearing impaired to inform the user of detected audio at or near the user. The translator is generally shown as 100 in FIG. 1. The translator 100 provides at least one transducer, such as a microphone, that detects audio. A processor of the translator analyzes the detected audio to match the audio with a phoneme. As discussed above, the English language is constructed from approximately forty four (44) different phonemes. The translator compares the detected audio to the phonemes to match the audio with a phoneme.

The translator also associates the phonemes of a particular language, such as the English language, with feedback codes. The actuators actuate to provide the feedback code associated with phoneme. The actuators of the translator communicate the feedback codes to the user for each detected phoneme.

In one embodiment, the translator alerts users to audio detected in the vicinity of the user. The translator 100 is designed to be worn on a user. Different embodiments may be worn on a user's head, clothing, belt, arm bands, or otherwise attached to the user. The translator informs users of sounds that may not have been detected by the user.

Figure 1:
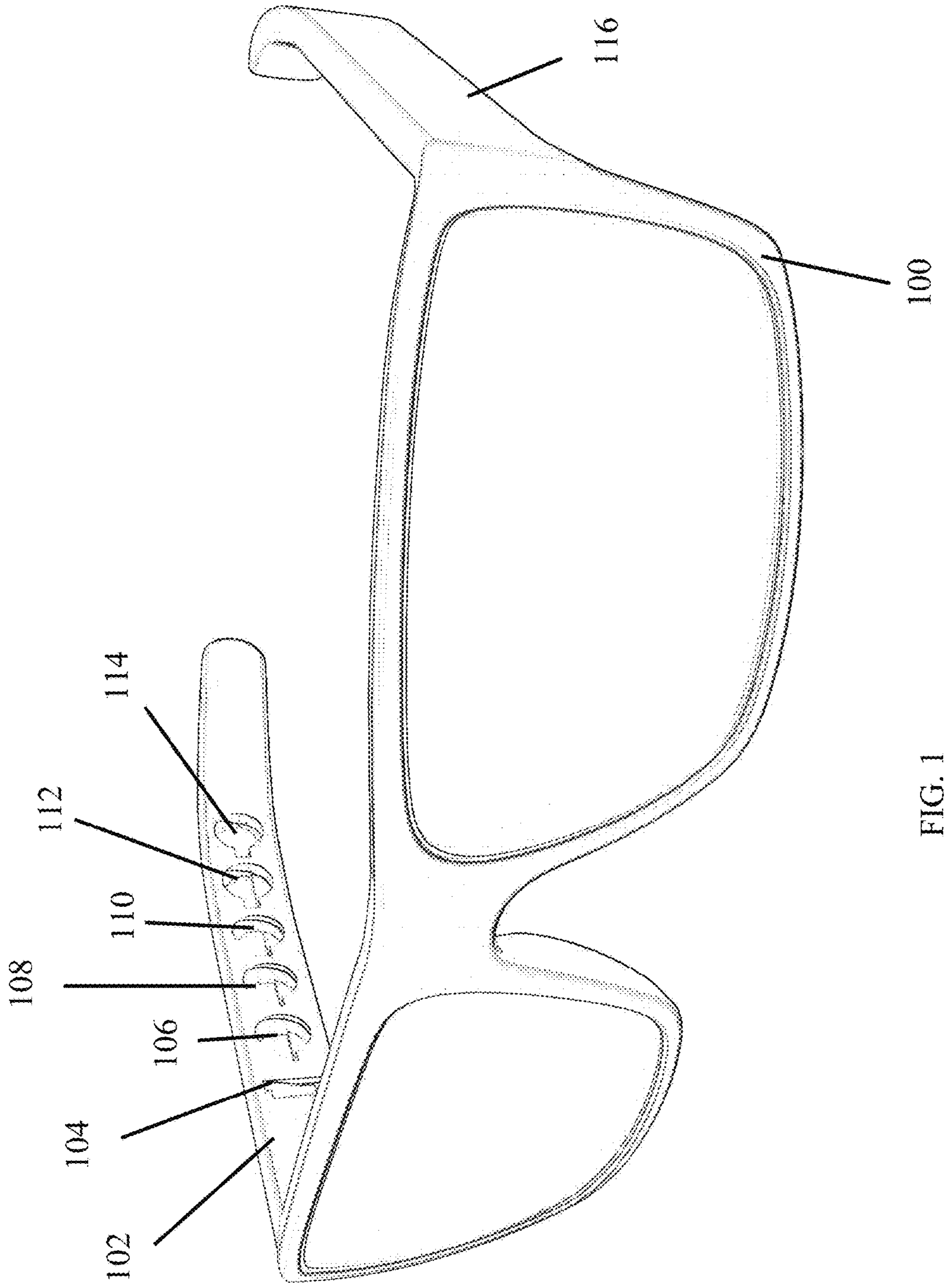
FIG. 1 is a front perspective view of one embodiment of the present invention.

FIG. 1 shows an embodiment of the translator 100 implemented in a pair of glasses. Stem 102 provides multiple apertures for placement of the actuators and the microphone. The translator 100 implemented within the glasses provides the electronics and software within the glasses.

Each pair of translator 100 glasses has a right and left temple piece (called) the stem 102, 116. Each stem contains a transducer, such as a microphone, and at least three haptic devices. In one embodiment, the haptic devices are constructed from actuators such as LRAs. The microphone may be installed within microphone aperture 104. The actuators may be installed within actuator apertures 106, 108, 110, 112, 114. The haptic devices are embedded in the stem and contact the wearer in the temple area on the left and right side of the head.

A microprocessor located either in the glasses or in a separate electronics package processes input speech detected by the microphones. The microprocessor controls the actuators to play various haptic effects according to the detected audio. In addition to the microphones and actuators, the translator 100 provides the following functions.

a. A Voice to Text Converter that converts audio (speech) signals received by the microphones into a text representation of that speech.

b. A Text to Phoneme Converter that converts the text into the phonemes that represent the text.

c. A Phoneme to Haptic Converter that converts the phoneme into a haptic effect. The translator of one embodiment uses a library of haptic effects that includes 123 different, unique and individual effects that can be "played" by each actuator. This library of effects is detailed in FIGS. 7, 7A, 7B, and 7C. These 123 effects vary from simple effects such as clicks, double clicks, ticks, pulse, buzz and transition hum to more complex effects such as transition ramp up medium sharp 1 to 100 (Effect #90).

The translator 100 represents the individual phonemic sounds (for example /d/—the sound of d in 'dog' or dd in 'add' with a haptic effect such as a click). Different haptic affects may be assigned to the different phonemes. For example, short vowel sounds may be represented by effects that vary from the long vowels. By using multiple actuators on each side of the head, the translator 100 conveys complex speech patterns.

The user associates a haptic effect with a phoneme. The user must also associate the phonemes that construct the spoken language. The user maps the phonemes to words which are understood by users to have various meanings.

By playing a series of haptic effects using the at least four actuators on each side of the head, the translator 100 encodes the detected audio into haptic feedback codes that represent the detected phonemes. The translator 100 is not limited to a single sequence since the translator 100 can play multiple effects if required to represent a particular phoneme. Each phoneme is mapped to a haptic effect that is played on the actuators.

The translator also detects hazards. A hazard may be indicated by a loud noise (much louder than the ambient noise level). The hazard detector will detect sounds such as alarm bells, sirens and sudden loud sounds such as bangs, crashes, explosions, and other sounds of elevated decibels. The hazard detection warns users of the hazard that was detected by sound to inform the user to look around to determine the location of the sound. The additional actuators inform the user of the direction from which the sound is detected to quicken the user's response time to the alarm, alert, and/or warning.

The translator allows the user to hear and recognize his own name. If the sound volume of the name recognition is greater than the normal speech sound, the detection of the user's name will be treated as an alarm condition indicating that someone is urgently attempting to get the user's attention. The translator 100 provides special encodings in the haptic effects to indicate alarms and whether they are in the right or left field of hearing. The translator 100 provides hardware and software that analyze the detected sounds and determine the direction from which the sound originated. A gyro located in the glasses frame of the translator 100 provides the microprocessor with the look angle of the user. As the user turns his/her head and sound volume changes, the haptic devices signal the direction of the sound. Knowing the direction of the detected audio benefits the user by directing the user towards the speaker and attend to other (e.g., visual) cues for improved communications.

Figure 2:
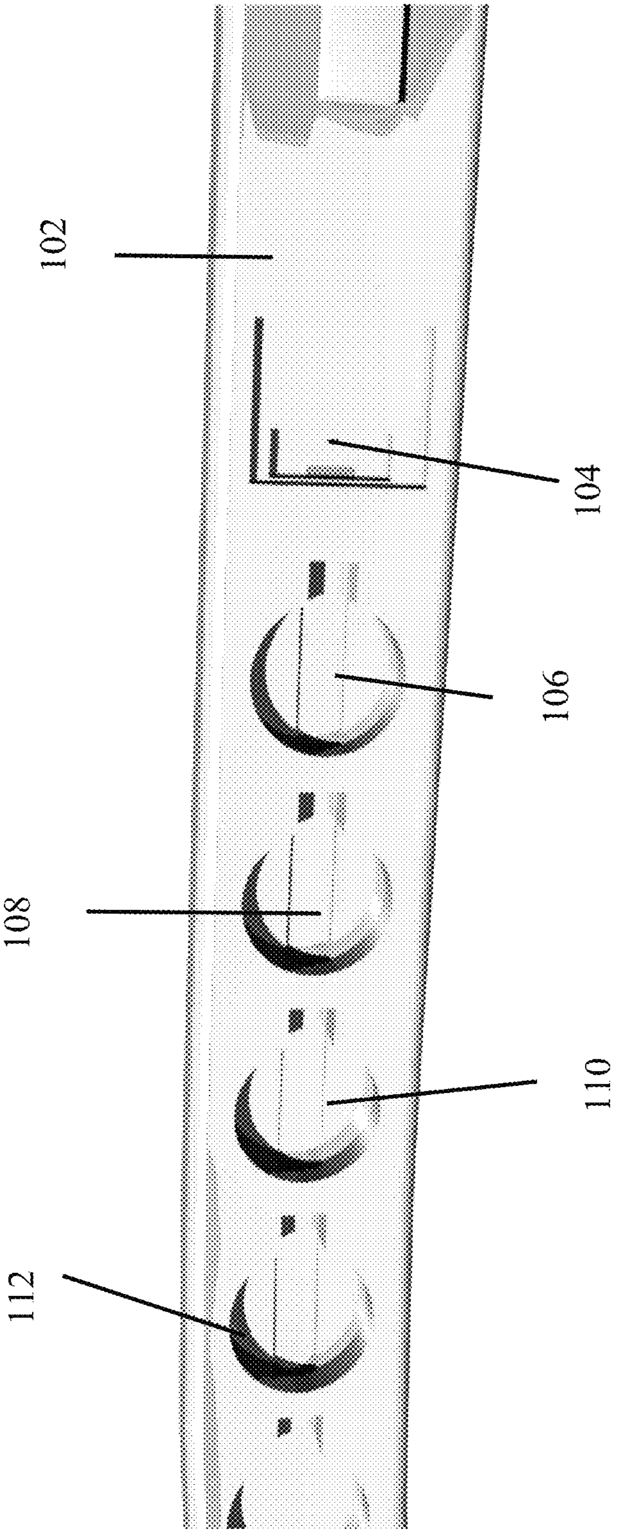
FIG. 2 is a partial view of a stem of one embodiment of the present invention.
Figure 3:
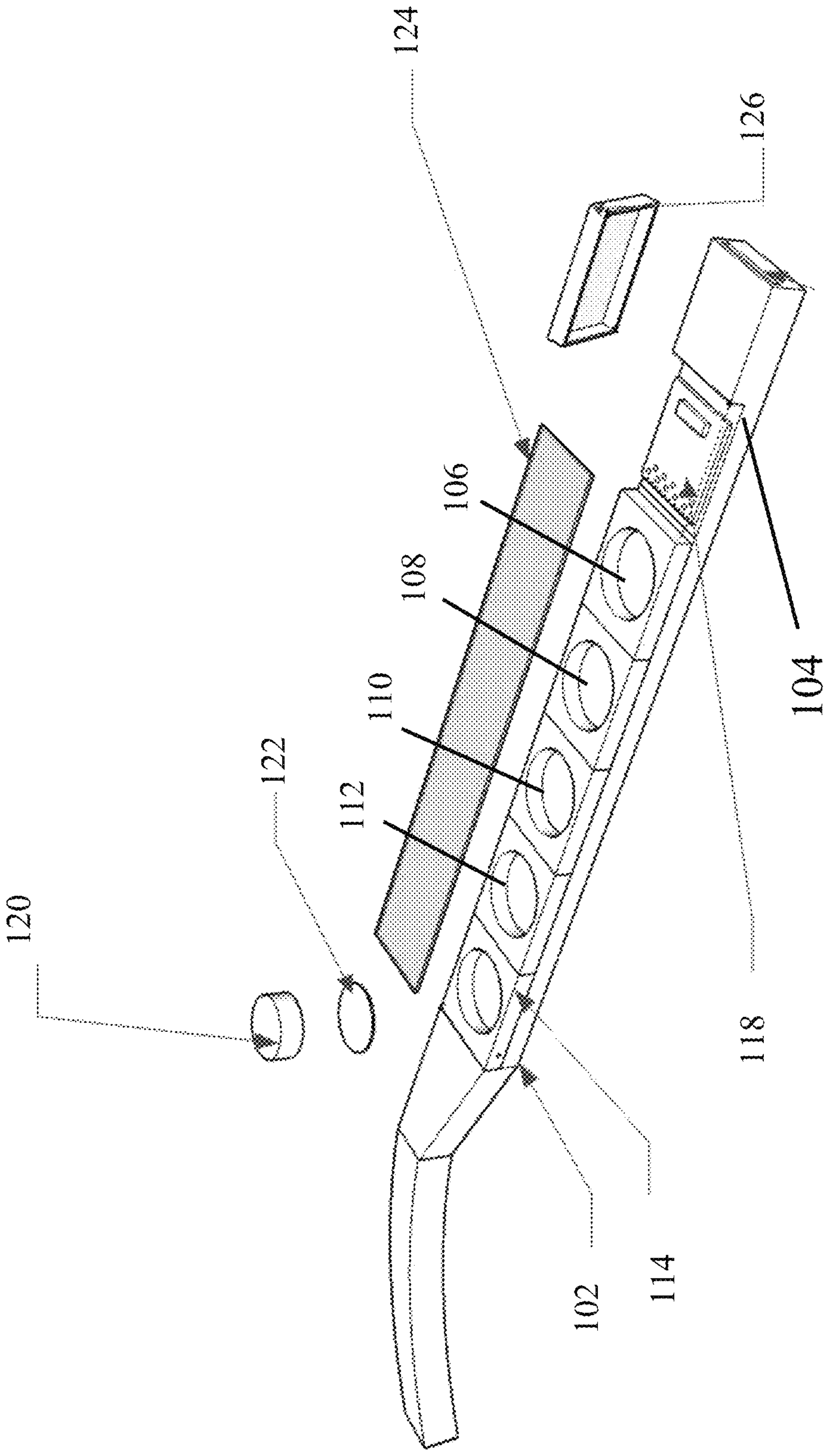
FIG. 3 is an exploded view of a stem of one embodiment of the present invention.

The translator 100 uses at least one microphone, preferably two or more, for detecting audio. As shown in FIGS. 1 and 2, the microphones may be installed within frames 102, 116 at microphone apertures 102. One example of the microphone 118 with microprocessor is shown in FIG. 3. The microphone 118 communicates with the microprocessor for translation of the detected audio into the phonemes and translating the phonemes into the haptic feedback.

Figure 4:
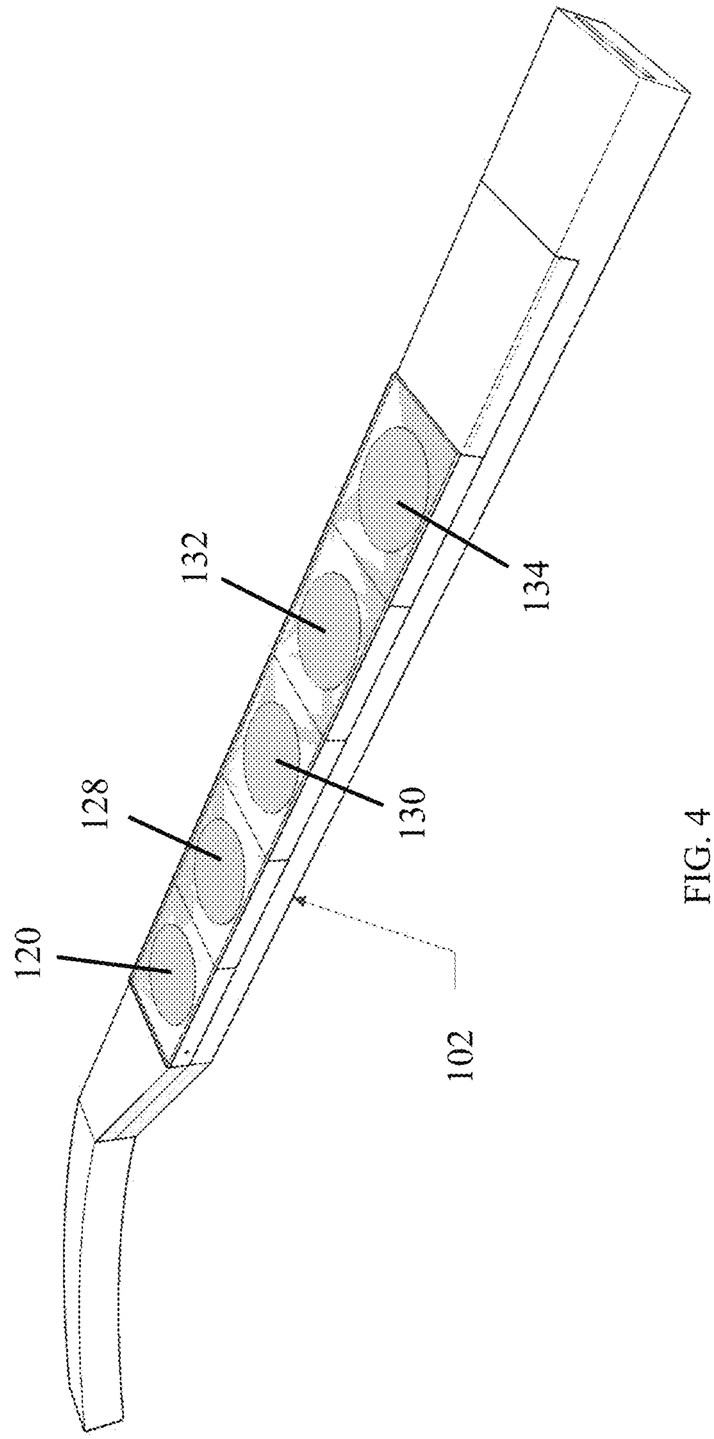
FIG. 4 is a perspective view thereof.

Continuing to refer to FIGS. 1 and 2, the actuator apertures 106, 108, 110, 112, 114 within the stems 102, 116 enable installation of the actuators 120 shown in FIGS. 3-4 to the stems 102, 116. The actuators 120 installed within stems 102, 116 are placed on an interior side of the stems 102, 116 adjacent the user's head. The actuators 120 can then contact the user to inform the user of the detected audio and the direction of the detected audio.

FIG. 3 shows a number of components of the translator 100. The microphone 118 with microprocessor installs at microphone aperture 104 onto stem 102, 116. Each microphone detects audio near the user. In one embodiment, each microphone may control at least one alert system, such as the actuators on stem 102 or stem 116. In another embodiment, the microphones may control multiple alert systems, the actuators on both stems 102, 116. The actuator control may include, but is not limited to, a processor, a circuit board, a microprocessor, a smart phone, a computer, or other computing device. The actuator control processes the information, such as the detected audio input into the microphone to activate the appropriate actuators. The use of a smart phone or computing device may provide the user with increased functionality such as additional computing power and a display for displaying the detected audio translated into text.

The actuator control also communicates with at least one alert system. The actuator control provides signals to the alert system to activate the appropriate actuators. Multiple alert systems may be utilized by the translator 100. The actuator control activates the actuators depending on the detected phonemes. The microphone, actuator control, and alert systems may be hard wired together or may communicate wirelessly.

The translator device 100 also includes a power supply such as batteries or a rechargeable power source. The translator 100 preferably uses a portable power source. In another embodiment, the translator 100 uses a wired power source.

The stimulators of one embodiment of the present invention may be constructed from an actuator, solenoids, servo motors, LRAs, or other devices that can apply pressure or produce a haptic feedback code to an object to create contact with the user. The stimulator control 106 applies power to the stimulator according to the audio input received by the microphone. Activating the stimulator causes the stimulator finger to adjust to the detected position to contact the user or activates the actuator to produce a haptic effect. The pressure and/or haptic effect applied to the user warns the user of the audio input and the detected phoneme.

One embodiment of the translator 100 provides stimulators 120 capable of providing haptic feedback, such as actuators, installed within apertures 106, 108, 110, 112, 114. These haptic feedback devices may be the stimulators described above, Linear Resonator Actuators (LRAs), contact devices, servo motors, solenoids, etc. These actuators may be activated to a detected effect indicating that audio has been detected. The detected effect may produce a haptic effect such as a haptic feedback. The actuator may also produce a clear feedback indicating that no audio or sound has been detected. In one embodiment, the clear feedback may be that the actuator produces no feedback.

One embodiment of the present invention provides a special class of haptic feedback devices called Linear Resonant Actuators (LRAs) to provide the user with the ability to detect audio. The LRAs provide touch feedback indicating the phonemes that have been detected and the direction from which the audio originated.

The LRAs, the haptic feedback device, stimulators are located in the glasses at stems 102, 116. The haptic feedback devices, such as the stimulators, LRAs etc. are installed in multiple locations along the stems 102, 116 of the glasses. The stimulators, LRAs, of one embodiment, are disks that are approximately 10 mm in diameter and approximately 3.6 mm thick. These haptic feedback devices may be mounted in the stems 102, 116 such that the operation of the individual LRA can be discerned by the wearer without being confused with the actuation of other LRAs, such as the adjacent LRAs, located in the glasses stem 102, 116.

However, one embodiment implements LRAs that are capable of presenting additional information to the user. Our particular implementation provides each LRA with 123 different haptic effects. A haptic effect might be a tap, buzz, click, hum, etc. Thus, by using combinations or effects and different encoding schemes it is possible to provide significantly more information than can be obtained using simple positional encoding.

FIG. 3 shows an exploded view of the stem 102 showing the stem construction, the components of the stem, and the mounting and installation of the LRAs 102 within the stems 102, 116. Each stem (both right and left) 102, 116 of one embodiment are constructed with 5 Linear Resonant Actuators (LRAs) 120. Each LRA 120 is mounted in an actuator aperture 106, 108, 110, 112, 114 with an isolation pad 122 that mechanically isolates the LRA 120 movement for each device. The LRAs 120 connect to the LRA drivers which are located on an actuator control within the glasses. Each LRA 120 has two wire leads which are routed inside the body of the stem to an Interconnect Module.

The mechanical design of one embodiment provides a mechanism for both holding the LRA 120 as well as isolating its effects from the glasses stem 102, 116. The haptic feedback from an LRA 120 must be discernible both in location and in touch effect. A vibrations isolation pad 122 provides this isolation. The pad 122 is secured to the stems 102, 116 to dampen the effect of the LRA 120 on the stems 102, 116 to isolate the effect of the LRA 120 to a single contact point on the user.

The Stem Interconnect Module provides the transition between the LRA leads and a flexible printed circuit (FPC) connector. A FPC connects the Stem Interconnect Module with the appropriate Haptics control module through the glasses stem hinge.

A cover, such as an elastomeric cover is placed over the LRAs 120. Cover 124 provides a barrier between the user and the LRAs 120 such that the cover 124 contacts the user when the LRA produces the haptic feedback. Note that cover 124 prevents the LRAs 120 from touching the user's skin while transmitting the complete haptic effect. In another embodiment, the LRAs 120 may directly contact the user instead of the indirect contact created by cover 124.

In one embodiment, LRA 120 feedback occurs in a single plane controlled by software. The processor directs the activation of the LRAs 120 according to the information detected by the microphones. The processor, the software, and the LRAs 120 provide significant advantages over other mechanical vibratory actuators.

LRAs 120 installed in the glasses stem 102, 116 have significant capabilities. Other kinds of actuators are simple on/off devices. LRAs 120 provide many different types of haptic effects. In one embodiment, the LRAs 120 may provide up to 123 haptic effects using an on-chip library in each haptic driver integrated circuit. Haptic effects include effects such as click, click with ramp down, pulsing, ramp up with pulsing, bump, soft bump, buzz, etc. Haptic effects can be sequenced and modulated in terms of magnitude and duration.

FIG. 4 shows stem 102 which is similar to stem 116. Each stem 102, 116 provides at least four actuators. In one embodiment, stems 102, 116 provide five actuators 120, 128, 130, 132, 134. The actuators 120, 128, 130, 132, 134 are located on an interior side of the stems 102, 116 to place the actuators 120, 128, 130, 132, 134 adjacent the user's head.

Figure 5:
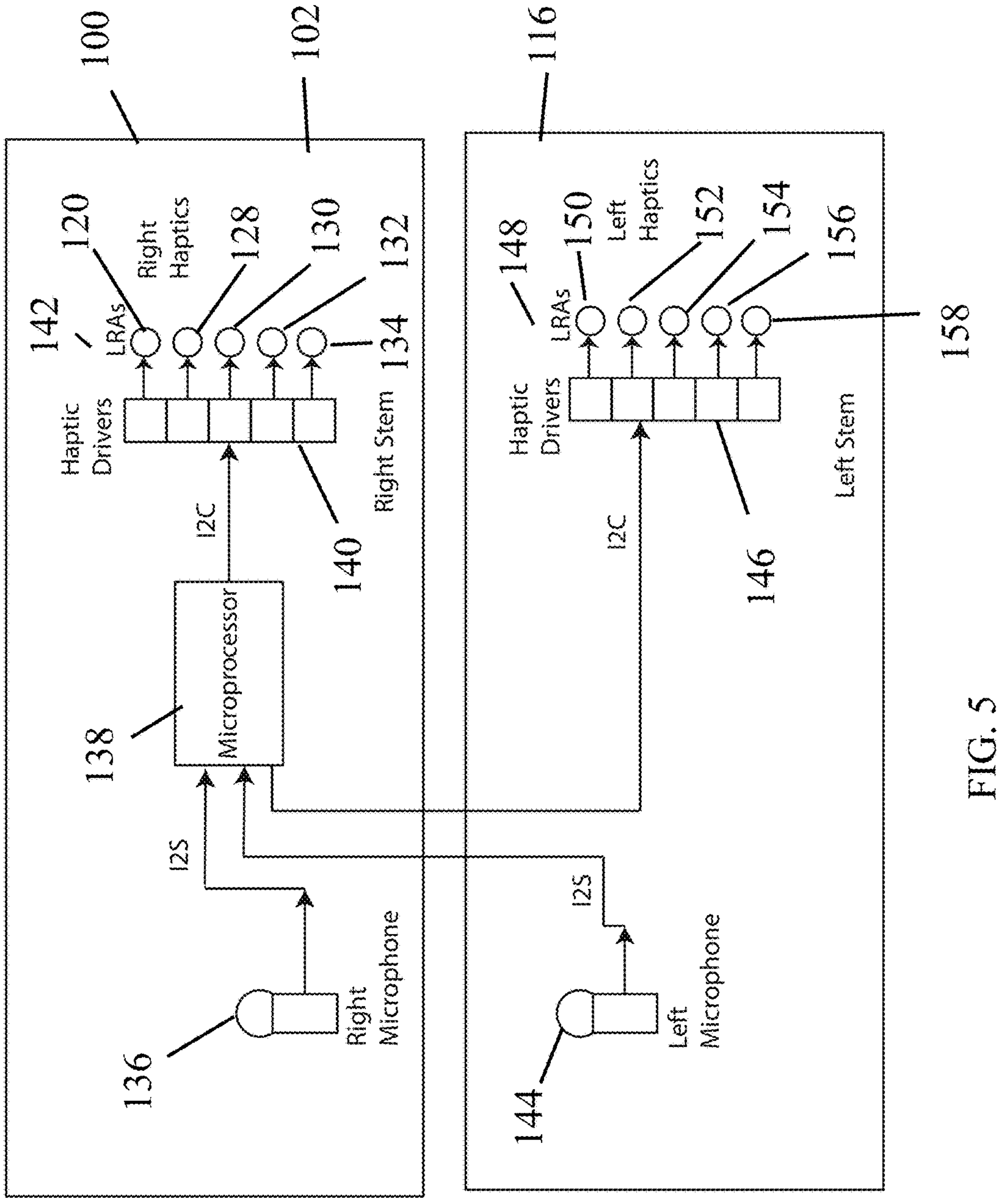
FIG. 5 is a schematic view of one embodiment of the present invention.

FIG. 5 shows a schematic view of one embodiment of the translator 100 implemented on the stems 102, 116 of a glasses frame. The translator 100 utilizes two microphones 136, 144. The microphones may be digital microphones or other devices that can capture audio. The microphones 136, 144 are located in the forward part of the stems of the glasses closer to the user's face and eyes. One microphone 144 is located in the left stem 116, the other microphone 136 in the right stem 102. The microphones 136, 144 implemented in one embodiment invention are omnidirectional Microelectromechanical systems (MEMS). Such microphones provide high performance and require low power for operation. A typical microphone of one embodiment is 4mm×3 mm×1 mm and requires 1 Volt with 10-15 μA of current. The digital audio capture device provides an I2S digital signal that can be directly processed by a microprocessor.

The microphones 136, 144 provide two major functions. First, the microphones 136, 144 capture the audio and convert received speech sounds from the analog domain to the digital domain. Sampled digital speech is sent to the microprocessor 138 for processing functions that convert the digitized speech to phonemes and then to a specified haptic effect.

The second major function of the microphones 136, 144 is to provide sound localization. Sound localization determines the direction a sound originates. The translator 100 localizes the sound by detecting differences in the sound detected by each microphone 136, 144. The basic principles used in localizing and determining the azimuth of a sound involve inter-aural intensity difference (IID) and the inter-aural time difference (ITD). IID is caused primarily by the shading effects of the head. ITD is caused by the difference in distance the sound must travel to reach microphone.

The time delay between signals provides a stronger directional cue than sound intensity. Tones at low frequencies less than 2 kHz have wavelengths longer than the distance between the ears and are relatively easy to localize. Pure tones at higher frequencies are more difficult to localize. However, because pure tones are rare in nature (and in speech) and high frequency noise is usually complex and random enough to allow unambiguous intramural delay estimations.

A number of established techniques for localizing sounds exist. These techniques include cross-correlation, the use of the Fourier transform and a method using the onset or envelop delay of the speech sounds.

One embodiment of the translator 100 uses the onset delay method coupled with a cross-correlation computation. Human speech is characterized by having frequent pauses and volume changes which results in an envelope of non-ambiguous features useful for measurement of inter-aural delay. This technique rejects echoes (because the sound of interest arrives before associated echoes) and provides an ideal mechanism for localization.

An onset signal correlation algorithm creates a multi-valued onset signal for each microphone input (in comparison to Boolean onset events detected by other methods). Each microphone signal is recorded as a discrete sequence of samples. The envelope signals are generated using a peak rectifier process that determines the shape of the signal magnitude at each input, such as microphone 136, 144. The onset signals are created by extracting the rising slopes of the envelopes. Finally, the onset signals are cross-correlated to determine the delay between them.

The cross-correlation allows determination of the azimuth of the sound source. The azimuth is given by the expression $$\theta=\sin^{-1}((V_{sound}*ITD)/D_m)$$

where $V_{sound}$ is the speed of sound in air (in a comfortable indoor environment is approximately 344 m/s), ITD is the delay calculated using the onset delay and correlation algorithm, and $D_m$ is the distance between microphones.

Other embodiments may provide a three-axis gyro that detects movement and motion of the device. The gyro with the three-axis accelerometer can detect head motion detection and measure tilt angle between the view angle and the horizon. The gyro can also provide dead-reckoning navigation to furnish the user with feedback on the current location. Such a gyro installed in the device may include but is not limited to the InvenSense MPU-9150: 9-axis MEMS motion tracking device.

Other embodiments may provide a three-axis accelerometer that detects movement and motion of the device. Such an accelerometer installed in the device may include but is not limited to the InvenSense MPU-9150: 9-axis MEMS motion tracking device.

Other embodiments may also provide a three-axis compass that detects movement and motion of the device. The compass aids the user in navigating his/her surroundings. Such a compass installed in the device may include but is not limited to the InvenSense MPU-9150: 9-axis MEMS motion tracking device.

As discussed above, a left microphone 144 and a right microphone 136 acquires the audio input necessary to inform the user of the detected audio. A left and right actuator control 140, 146, such as the haptic drivers, provides the electronics for controlling the individual LRAs. The actuator controls 140, 146 connect through circuits, such as flexible printed circuits, to the microprocessor 138. The microprocessor 138 includes a number of other sensor subsystems. The microprocessor 138 of the present invention may be a high performance microprocessor, such as but not limited to a 32 bit microprocessor, a 64 bit microprocessor, etc.

The translator 100 shown in FIG. 5 provides alert systems 142, 148. Alert system 142 installed on right stem 102 contacts the right side of the user's face. Alert system 142 is constructed from actuators 120, 128, 130, 132, 134. Alert system 148 installed on the left stem 116 contacts the left side of the user's face. Alert system 148 is constructed from actuators 150, 152, 154, 156, 158.

A Power Module is provided for managing system power and hibernation of the translator 100. One embodiment of the translator 100 is battery powered. Other embodiments of the present invention may be powered by alternative sources.

The translation system of the present invention maps each phoneme to a haptic effect. A list of the phonemes of the English language can be found at FIGS. 6 and 6A. The translation system communicates the detected phonemes to the user via haptic effects of an actuator. The haptic effects of the actuators may include the haptic effects described in FIGS. 7, 7A, 7B, and 7C.

A sampling of the haptic effects 160 assigned to each phoneme 170 can be found at FIGS. 8 and 8A. A haptic effect is assigned to a number of the actuators. For example, one embodiment translates each phoneme into a haptic feedback code communicated through three actuators as shown in feedback codes 166, 168. The translator communicates the haptic codes through the strong side 162 and the weak side 164. The strong side 162 refers to the side from which the detected audio originated. The weak side 164 is opposite of the strong side 162.

For example, the actuators of one embodiment are capable of 123 different haptic effects as shown in FIGS. 7, 7A, 7B, and 7C. FIGS. 7, 7A, 7B, and 7C show each haptic effect assigned to an effect id. The haptic effects may vary in strength and frequency. Feedback codes 166, 168 show the haptic feedback codes assigned the phoneme of the /b/ sound. The translator of this embodiment uses three actuators to communicate the detected phoneme. The strong side 162 indicates the side from which the sound originated. One actuator of the strong side 162 provides the feedback of DoubleClick at 100%. The other actuators of the strong side 162 remain inactive as shown with the 0s. One actuator of the weak side 164 provides the feedback of DoubleClick at 60%. The other actuators of the weak side 164 remain inactive as shown with the 0s.

The feedback of one embodiment defines the strong side as the side from which the audio originates, while the weak side is opposite of the strong side. For example, the actuators on the right side of the user's head will produce a different feedback if the detected audio originates from the right side, the strong side, of the user. Likewise, the actuators on the left side of the user's head will produce a different feedback if the detected audio originates from the left side, the strong side, of the user. The strong side will be the side of the user from which the audio originated. To emphasize the direction of the detected audio, the actuators of the strong side of one embodiment may produce a feedback at a greater frequency, strength, or both frequency and strength, than the actuators on the weak side. In another embodiment, an actuator may provide the user with information concerning the direction from which the audio originated.

A combination of haptic effects, such as haptic codes, represents each word. The translation system expresses the detected audio to the user as a combination of haptic codes that define the effects (touches). The English language requires approximately 44 phonemes for speaking and understanding the English language. Other languages may require a different numbers of phonemes.

In one embodiment, multiple microphones detect the audio. During mapping of the detected audio, the translator maps the haptic effects accordingly to both the strong side and weak side of the direction in which the audio is detected.

The haptic effects are identified by their effect ID number. Refer to FIGS. 7, 7A, 7B, and 7C for a description of the haptic effect. While there are 123 unique haptic effects, some are more suited to the kind of signaling required in the translator (i.e., easier to detect and characterize). Others, as noted previously are simply lower intensity versions of the same effect. For example, haptic effect #56 is characterized as "Pulsing Sharp 1_100" while effect #57 is "Pulsing Short 2_60" which indicates that effect #57 is played with 60% of the intensity of effect #56.

The mapping problem involves selecting the most effective set of haptic effects to form the haptic code that represents the particular phoneme. This encoding can be either spatial (by LRA location in the glasses stem) or temporal (playing two different effects one after the other on the same LRA) or a combination of both positional and temporal mapping. FIGS. 8 and 8A show an example of a mapping of up to three effects being played to encode a particular phoneme. The effects can be spatial, temporal, or a combination of both. Such a library shown in FIGS. 8 and 8A associate a phoneme with a feedback code.

The system detects the audio. The computing device then analyzes the detected audio to identify a phoneme. The system then identifies a feedback code associated with the identified phoneme from the detected audio. The device associates a feedback code with each phoneme. In one embodiment, the feedback code assigns different haptic effects across multiple actuators. A library of one embodiment associates the phonemes to the feedback codes.

The system identifies the feedback code associated with the detected phoneme. The system then produces the haptic effects for the designated actuators identified by the feedback code.

Figure 9:
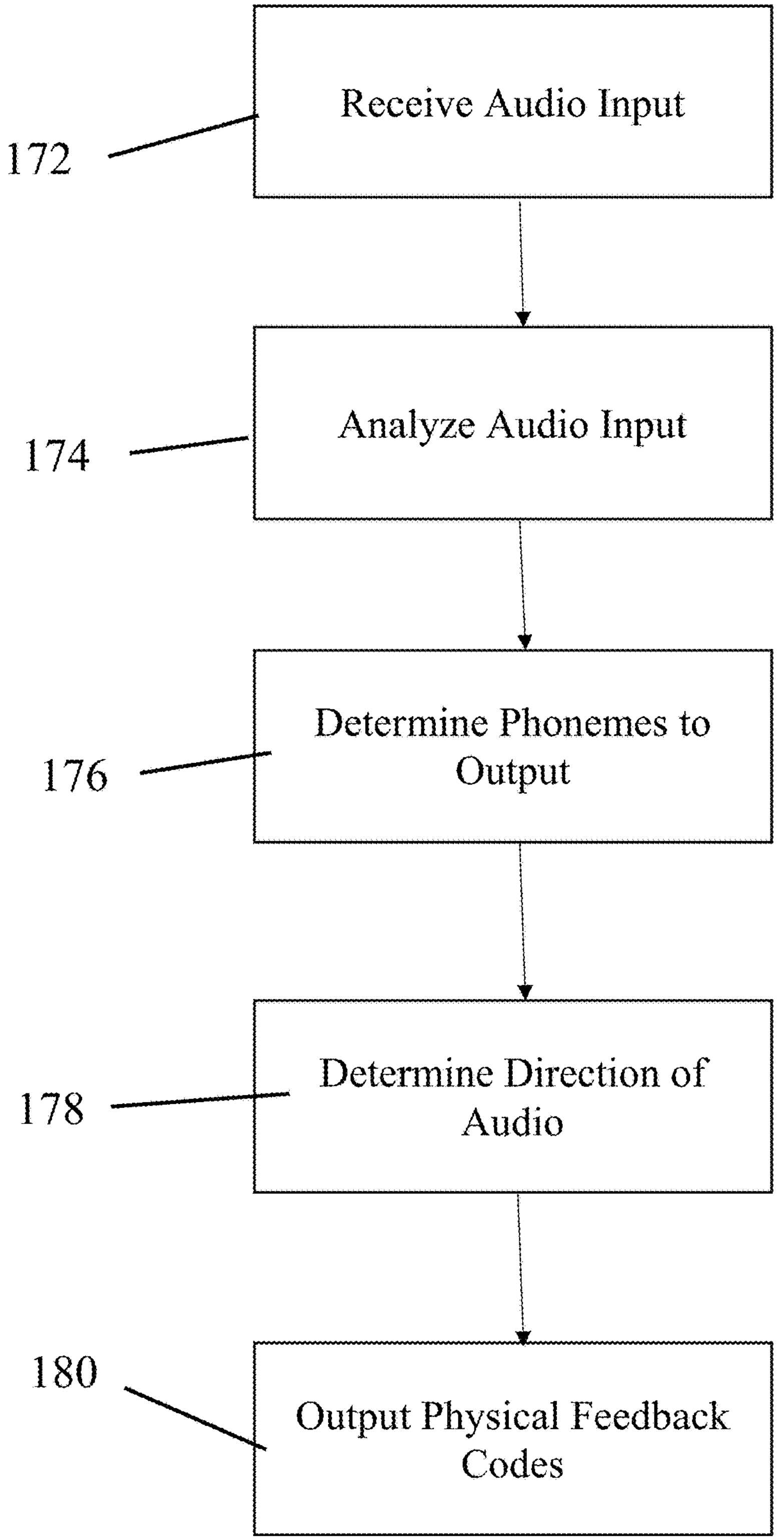
FIG. 9 is a flowchart showing one embodiment of the present invention.

FIG. 9 shows a flowchart of detecting the audio and outputting the appropriate feedback codes. The microphones receive the audio input at Receive Audio 172. Because the microphones are positioned at separate locations, the microphones receive the audio at different times. The system analyzes the audio at Analyze Audio 174. The system determines the different audio that has been detected.

The system analyzes several different characteristics of the audio. The system determines the words that were detected, the volume of the words, and the direction of the detected audio. The system also determines whether the alarm conditions exist.

When analyzing the words, the system analyzes the detected audio to determine the spoken words. The system of one embodiment performs a speech to text translation to determine the words that were actually spoken. The system then looks up the phonemes that construct the words. In another embodiment, the system detects the phonemes that were spoken. The system of one embodiment creates a record of the detected audio to store a transcript.

The system determines the phonemes to output to the user. The phonemes can be based upon the speech to text translation that occurred. In one embodiment, the system reviews the text to determine the phonemes to output. Each word is constructed from at least one phoneme. The system analyzes the words to determine the phonemes. The system then outputs the feedback code according to the phonemes to be output.

In another embodiment, the system simply detects phonemes through the microphone. The system designates the phonemes to output to the user. The system then outputs the phonemes through the actuators.

The system also determines the direction of the audio at Step 178. The system analyzes the time that each microphone receives the input audio to determine the direction of the input sound. The system performs the calculations as discussed above to determine the direction. The system then identifies the side from which the sound originated, the strong side, and the weak side.

The system then outputs the physical feedback codes at step 180. The system has analyzed which phonemes to output to the user. The system then outputs the feedback code associated with each phoneme to be output to the user. The system can look up the mapping of the phonemes to the associated feedback code or the feedback code may be hardwired into the microprocessor and the haptic controls.

In one embodiment, the system outputs the feedback code through three of the actuators. Three actuators capable of 123 different haptic effects provide sufficient variations to output the forty-four (44) phonemes of the English language. The system determines the strong side and weak side and outputs the feedback code according to the origination of the sound.

Using three actuators for outputting the feedback code leaves two actuators for providing additional information. The additional actuators can provide additional direction information as to whether the sound came from behind the user, in front of the user, to the side of the user, or other information regarding the 360 degrees around the user.

The other actuator may provide information regarding the volume of the detected audio. Understanding the volume of the audio enables the user to understand the urgency with which the user is being spoken to. The volume also allows the user to gain a better understanding of reflection to determine whether the speaker is being sarcastic or other impressions that are expressed through the volume of the speaker.

In one embodiment, the microphone detects sounds from all around the user. The system of another embodiment provides the option to focus on sounds directly in front of the user. Such an embodiment provides a conversation setting that emphasizes on audio input from a forward facing direction from the user. The system outputs feedback codes associated with the audio input from a forward facing direction from the user. The system may also implement additional microphones, such as unidirectional microphones, to better distinguish the direction from which the sound originates.

The system of one embodiment provides different settings that the user can activate the conversation setting to focus on audio input from the forward facing direction, the primary sound. The system then places less of an emphasis on the background noise and ambient noise.

The environmental setting outputs feedback codes to the audio that is detected. The microphones accept input from 360 degrees around the user. In such an embodiment, the user will be alerted to sounds behind the user, to the side of the user, and otherwise surrounding the user.

Further, each haptic actuator can produce a different haptic effect if desired. Such features available through the haptic actuators provide a significant new capability in terms of providing haptic feedback indications. The present invention allows the user to program effects that are most suitable for his/her use and particular situation. Some users may need/want stronger effects, others more subdued effects. Some users may be capable of decoding more information using multiple effects, while other users may want simple effects providing simple encoding of the phonemes.

Further, the haptic effects may be tuned to the particular glasses stem instantiation. Each stem instantiation may be best optimized using a different LRA effect. In one embodiment, the LRAs may be programmed in the different stem design/implementations to provide the best user experience.

One embodiment of the present invention provides the ability to create a digital record of the detected audio, a text record of the speech, and a time stamp indicating when the detected audio was captured. This data will be valuable in analyzing use of the device and in detecting any problems with the device. The data can also serve as a record of the detected audio and the conversations the user may have had. The device may provide storage, including a hard drive, a flash drive, an SD cart slot for the card, and other digital storage, for storing such information. Any collected data will be stored to the storage and can then later be removed and analyzed.

In one embodiment, the present invention assists the user with correct pronunciation of terms, words, and phrases. The microphone of the systems captures the audio of the user's spoken word. The system then analyzes the captured audio to determine the phonemes spoken by the user. The user, having knowledge of what was said, can then compare the phonemes output to the user with the user's spoken word. If the phonemes output to the user match the spoken word, the user can confirm that the user has spoken with the proper pronunciation. If the phonemes do not match, the user can continue pronouncing the intended word until the user pronounces the word correctly. The system will then notify the user that the user has pronounced the word correctly.

In another embodiment, the user can identify the intended words by typing in the words. The system can then speak the intended words. The system indicates whether the user's spoken word matches the intended word, words, and/or phrases. The system notifies the user either visually through a screen or through a tactical indication via the actuators.

A number of characteristics of the device can be customized to meet a particular wearer's preferences, such as maximum range, sensitivity, and the haptic effects. In some instances, users will want to adjust the maximum range of the glasses. One embodiment provides an indoor and an outdoor mode that changes the ranges at which audio is detected and changes the ranges from which the user is notified of the detected audio. However, device allows the user to set the range as required.

The user also can set the sensitivity of the glasses to detect lower volume sounds. In one embodiment, the device can inform the user of lower decibel sounds. In other cases, the user may be interested in only louder sounds. The user establishes a minimum decibel level at which the system will provide feedback codes for the audio input. The system of one embodiment communicates the feedback codes for the audio input that meets the minimum decibel level. The system of such an embodiment avoids providing feedback codes for the audio input that does not meet the minimum decibel level.

In another embodiment, the user may also adjust the system to produce feedback to all audio input regardless of the volume. Such a setting enables the user to react to any detected noise.

The user may also select the type of haptic effects for the device to use. Each LRA of one embodiment provides a library of 123 effects. Effects can be combined for a particular LRA and the intensity and duration of the effect determined by the wearer. The user can apply the same haptic effect to all LRAs or can specify a different effect for each LRA if desired. The user may also define different haptic effects based on an outdoor mode and an indoor mode so that the user can be made aware of the selected mode based upon the haptic effect.

The present invention may also utilize additional sensors and feedback devices to provide the user with additional information.

The present invention has been described as using approximately linear configurations of stimulators. The stimulators may be arranged horizontally, vertically, diagonally, or in other configurations. The stimulators may also be arranged in different configurations as long as the user is informed as to the meaning of the contact of a stimulator/actuator at a specific contact point.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An audio translation device for translating detected audio to a tactile response on a user's body, the device comprising:

a right transducer that detects a right detected audio;

a left transducer that detects a left detected audio wherein the left transducer is positioned left of the right transducer;

a computing device that translates the right detected audio and the left detected audio;

the computing device identifying a strong side and a weak side by calculating an inter-aural intensity difference between the left detected audio and the right detected audio;

the computing device accessing a library, wherein the library associates different haptic feedbacks to the strong side and the weak side;

the computing device analyzing the right detected audio to identify a right detected phoneme that matches the right detected audio;

the computing device analyzing the left detected audio to identify a left detected phoneme that matches the left detected audio;

the computing device identifying a right matching haptic feedback associated with the right detected phoneme;

the computing device identifying a left matching haptic feedback associated with the left detected phoneme;

the computing device assigning a strength of the haptic feedback of the right matching haptic feedback and a strength of the left matching haptic feedback based upon the strong side and the weak side, wherein the computing device assigns, based on the library, a stronger haptic feedback to the strong side;

a first right actuator producing the right matching haptic feedback, wherein the first right actuator produces at least three different haptic feedbacks; and a first left actuator producing the left matching haptic feedback, wherein the first left actuator produces at least three different haptic feedbacks, wherein the left actuator is positioned left of the right actuator, wherein the first right actuator produces a stronger feedback if the right detected audio detected by the right transducer is louder than the left detected audio detected by the left transducer, wherein the first left actuator produces a stronger feedback if the left detected audio detected by the left transducer is louder than the right detected audio detected by the right transducer.

2. The device of claim 1 further comprising:

the library that associates a haptic feedback to a feedback code.

3. The device of claim 2, wherein the computing device identifies a matched feedback code from the library wherein the matched feedback code is associated with a detected phoneme.

4. The device of claim 1 further comprising:

the computing device identifying a second right matching haptic feedback associated with the right detected phoneme;

a second right actuator producing the second right matching feedback, wherein the second right actuator produces at least three haptic feedbacks.

5. The device of claim 4 further comprising:

a pair of glasses;

a right stem of the glasses, wherein the first right actuator and the second right actuator are located on the right stem.

6. The device of claim 4 further comprising:

the computing device identifying a second left matching haptic feedback associated with the left detected phoneme;

a second left actuator producing the second left matching feedback directed to the user wherein the second left actuator produces at least three haptic feedbacks.

7. The device of claim 1, wherein the right transducer and the left transducer are located on opposite sides of the user's body.

8. The device of claim 7, wherein the first right actuator and the first left actuator are located on opposite sides of the user's body.

9. The device of claim 8, wherein the first right actuator is located on the same side as the right transducer and the first left actuator is located on the same side as the left transducer.

10. An audio translation device for translating detected audio to a tactile response upon a first side of a user's head and a second side of the user's head, the translation device mounted onto a pair of glasses, the device comprising:

a right stem of the glasses adjacent the right side of the user's head;

a left stem of the glasses adjacent the left side of the user's head;

a first transducer that detects a right detected audio located towards the right side of the user;

a second transducer that detects a left detected audio located towards the left side of the user;

a computing device that translates the right detected audio and the left detected audio;

the computing device identifying a strong side and a weak side by calculating an inter-aural intensity difference between the right detected audio and the left detected audio;

the computing device accessing a library, wherein the library associates different haptic feedbacks to the strong side and the weak side;

the computing device analyzing the right detected audio to identify a right detected phoneme that matches the right detected audio;

the computing device analyzing the left detected audio to identify a left detected phoneme that matches the left detected audio;

the computing device identifying a right matching haptic feedback associated with the right detected phoneme;

the computing device identifying a left matching haptic feedback associated with the left detected phoneme;

the computing device assigning a strength of the right matching haptic feedback and a strength of the left matching haptic feedback based upon the strong side and the weak side, wherein the computing device assigns, based on the library, a stronger haptic feedback to the strong side;

a first right actuator located on the right stem, the first right actuator producing the right matching haptic feedback directed to the right side of the user's head;

a first left actuator located on the left stem, the first left actuator producing the left matching haptic feedback directed to the left side of the user's head;

the first right actuator producing a stronger feedback if the right detected audio is louder than the left detected audio.

11. The device of claim 10 further comprising:

the library that associates a haptic feedback to a feedback code;

the computing device identifying a matched feedback code from the library, wherein the matched feedback code is associated with a detected phoneme.

12. The device of claim 11 further comprising:

a second right actuator located on the right stem producing a second right matching haptic feedback directed to the right side of the user's head, wherein the matched feedback code assigns a haptic feedback produced by the first right actuator and the second right actuator.

13. The device of claim 12, wherein the haptic feedback produced by the first right actuator of the right stem is selected independently of the haptic feedback produced by the second right actuator of the right stem allowing the first right actuator and the second right actuator to produce different haptic feedbacks simultaneously.

14. The device of claim 10, wherein the first right actuator and the first left actuator produce at least one hundred and twenty three different haptic feedbacks.

15. The device of claim 12 further comprising:

a second left actuator located on the left stem producing a second left matching haptic feedback directed to the left side of the user's head, wherein the haptic feedback produced by the first left actuator of the left stem is selected independently of the haptic feedback produced by the second left actuator located on the left stem allowing the first left actuator of the left stem and the second left actuator of the left stem to produce different haptic feedbacks simultaneously.

16. An audio translation device for translating detected audio to a tactile response upon a right side of a user's head and a left side of the user's head, the translation device mounted onto a pair of glasses, the device comprising:

a right stem of the glasses adjacent the right side of the user's head;

a left stem of the glasses adjacent the left side of the user's head;

a right transducer that detects a right detected audio located towards the right side of the user;

a computing device that translates the right detected audio;

the computing device analyzing the right detected audio to identify a right detected phoneme that matches the right detected audio;

the computing device identifying a right matching feedback code associated with the right detected phoneme;

the right matching feedback code defining a right haptic feedback to be produced by a first right actuator and a second right actuator for the detected phoneme;

the first right actuator located on the right stem, the first right actuator producing the right matching haptic feedback directed to the right side of the user's head, wherein the first right actuator produces at least three different haptic feedbacks;

the second right actuator located on the right stem producing the right matching haptic feedback directed to the right side of the user's head, wherein the second right actuator produces at least three different haptic feedbacks;

wherein the matching feedback code assigns a haptic feedback produced by the first right actuator and the second right actuator;

a left transducer that detects a left detected audio towards the left side of the user;

the computing device analyzing the left detected audio to identify a left detected phoneme that matches the left detected audio;

the computing device identifying a left matching haptic feedback code associated with the left detected phoneme;

the left matching feedback code defining a left haptic feedback to be produced by a first left actuator and a second left actuator for the left detected phoneme;

the first left actuator located on the left stem, the first left actuator producing the left matching haptic feedback directed to the left side of the user's head, wherein the first left actuator produces at least three different haptic feedbacks;

the second left actuator located on the left stem producing the left matching haptic feedback directed to the left side of the user's head, wherein the second left actuator produces at least three different haptic feedbacks;

the computing device identifying a strong side and a weak side by calculating an inter-aural intensity difference between the left detected audio and the right detected audio;

the computing device accessing a library, wherein the library associates different haptic feedbacks to the strong side and the weak side; and the computing device assigning a strength of the right matching haptic feedback and a strength of the left matching haptic feedback based upon the strong side and the weak side, wherein the computing device assigns, based on the library, a stronger haptic feedback to the strong side.

17. The device of claim 16, wherein the left matching feedback code assigns the left haptic feedback produced by the first left actuator and the second left actuator;

wherein the right haptic feedback and the left haptic feedback produced by the first right actuator and the first left actuator are selected independently of the right haptic feedback and the left haptic feedback produced by the second right actuator and the second left actuator allowing the first right actuator and the first left actuator and the second right actuator and the second left actuator to produce different haptic feedbacks simultaneously.

18. The device of claim 17, wherein the right matching feedback code assigns the right haptic feedback to the first right actuator and the second right actuator, wherein the right haptic feedback produced by the first right actuator and the second right actuator is selected from at least one of three different haptic feedbacks, wherein the right feedback code assigns different haptic feedbacks to be produced by the first right actuator and the second right actuator simultaneously;

the left feedback code assigning the left haptic feedback to the first left actuator and the second left actuator, wherein the left haptic feedback produced by the first left actuator and the second left actuator is selected from at least one of three different haptic feedbacks, wherein the left feedback code assigns different haptic feedbacks to be produced by the first left actuator and the second left actuator simultaneously;

wherein the right actuators produce a stronger feedback if the right detected audio detected by the right transducer is louder than the left detected audio detected by the left transducer, wherein the left actuators produce a stronger feedback if the left detected audio detected by the left transducer is louder than the right detected audio detected by the right transducer.

19. The device of claim 18, wherein the actuators are linear resonator actuators.

20. The device of claim 6 further comprising:

a pair of glasses;

a left stem of the glasses, wherein the first left actuator and the second left actuator are located on the left stem; and a right stem of the glasses, wherein the first right actuator and the second right actuator are located on the right stem.

* * * * *